US011582059B2

United States Patent
Williams

(10) Patent No.: US 11,582,059 B2
(45) Date of Patent: Feb. 14, 2023

(54) EXTERNAL MICROCONTROLLER COMMUNICATIONS

(71) Applicant: Tracie Wireless LLC, Burlington, MA (US)

(72) Inventor: Christopher D. Williams, San Diego, CA (US)

(73) Assignee: Tracie Wireless LLC, Burlington, MA (US)

( * ) Notice: Subject to any disclaimer, the term of this patent is extended or adjusted under 35 U.S.C. 154(b) by 5 days.

(21) Appl. No.: 17/397,771

(22) Filed: Aug. 9, 2021

(65) Prior Publication Data

US 2021/0367807 A1 Nov. 25, 2021

Related U.S. Application Data

(63) Continuation of application No. 16/805,041, filed on Feb. 28, 2020, now Pat. No. 11,088,867, which is a (Continued)

(51) Int. Cl.
*H04L 12/28* (2006.01)
*H04L 12/46* (2006.01)
(Continued)

(52) U.S. Cl.
CPC .......... *H04L 12/2827* (2013.01); *H04L 12/46* (2013.01); *H04L 65/40* (2013.01); *H04M 3/42* (2013.01)

(58) Field of Classification Search
CPC ..... H04L 12/2827; H04L 12/46; H04L 29/08; H04M 3/42
See application file for complete search history.

(56) References Cited

U.S. PATENT DOCUMENTS 5,023,903 A * 6/1991 Bowen .................. H04M 11/06
                                               379/93.09
5,109,543 A    4/1992 Dissosway et al.
(Continued)

FOREIGN PATENT DOCUMENTS

WO    2015195329 A2    12/2015

OTHER PUBLICATIONS

International Search Report and Written Opinion issued in International Application No. PCT/US2018/048193 dated Jan. 9, 2019 in 15 pages.

*Primary Examiner* — Rasheed Gidado
(74) *Attorney, Agent, or Firm* — David H. Judson

(57) ABSTRACT

Messaging between an ultra-tag and external microcontroller. In an embodiment, a transmitting device is communicatively connected to a receiving device by a clear-to-communicate line and request line. When data to be transmitted has normal priority, the transmitting device detects whether the clear-to-communicate line indicates that the receiving device is available, indicates a request to transmit on the request line if so, waits until the receiving device is available and then indicates a request to transmit on the request line if not, after indicating a request to transmit, transmits the data when the clear-to-communicate line indicates that the receiving device is unavailable, and, after transmitting the data, releases the indication of the request to transmit on the request line. On the other hand, when the data has high priority, the transmitting device indicates a request to transmit on the request line, regardless of an indication on the clear-to-communicate line.

8 Claims, 8 Drawing Sheets

Related U.S. Application Data continuation of application No. PCT/US2018/048193, filed on Aug. 27, 2018.

(60) Provisional application No. 62/550,883, filed on Aug. 28, 2017.

(51) Int. Cl.
  *H04L 29/08* (2006.01)
  *H04M 3/42* (2006.01)
  *H04L 65/40* (2022.01)

(56) References Cited

U.S. PATENT DOCUMENTS

| | | | |
|---|---|---|---|
| 5,197,067 A | 3/1993 | Fujimoto et al. | |
| 5,473,604 A | 12/1995 | Lorenz et al. | |
| 5,574,947 A | 11/1996 | Massa | |
| 5,787,256 A | 7/1998 | Marik et al. | |
| 6,557,108 B1 * | 4/2003 | Moore | G06F 1/24 709/200 |
| 6,934,297 B1 | 8/2005 | Bensaou et al. | |
| 7,110,371 B2 * | 9/2006 | Monroe | H04W 88/02 370/464 |
| 7,467,312 B2 | 12/2008 | Esch et al. | |
| 7,660,346 B1 | 2/2010 | Klissner | |
| 7,738,389 B1 | 6/2010 | Taylor | |
| 2001/0034246 A1 * | 10/2001 | Hutchison, IV | H04M 11/06 455/572 |
| 2005/0102556 A1 | 5/2005 | Yamada et al. | |
| 2009/0228623 A1 | 9/2009 | Tsuchiya | |
| 2011/0019797 A1 | 1/2011 | Lim et al. | |
| 2012/0263186 A1 | 10/2012 | Ueno | |
| 2012/0289260 A1 | 11/2012 | Yach | |
| 2014/0016458 A1 | 1/2014 | Moritomo | |
| 2014/0126026 A1 | 5/2014 | Inoue | |

* cited by examiner

400A

400B

EXTERNAL MICROCONTROLLER COMMUNICATIONS

CROSS-REFERENCE TO RELATED APPLICATIONS

This application claims priority to U.S. patent application Ser. No. 16/805,041, filed on Feb. 28, 2020, which is a bypass continuation of International Patent App. No. PCT/US2018/048193, filed on Aug. 27, 2018, which claims priority to U.S. Provisional Patent App. No. 62/550,883, filed on Aug. 28, 2017, which are all hereby incorporated herein by reference as if set forth in full.

BACKGROUND

Field of the Invention

The embodiments described herein are generally directed to external microcontroller communications, and, more particularly, to a messaging protocol between the ultra-modem of an ultra-tag and an external microcontroller.

Description of the Related Art

Currently, a need exists for a messaging protocol between an external microcontroller (e.g., managing a sensor) and an ultra-modem which relays data between the external microcontroller and a cloud-based platform.

SUMMARY

Accordingly, systems, methods, and non-transitory computer-readable media are disclosed for a messaging protocol to be used between the modem of a compact wireless device (also referred to herein as an "ultra-tag") and an external microcontroller communicatively connected to the compact wireless device (e.g., via a direct or indirect, wired or wireless connection).

In an embodiment, a method is disclosed that comprises using at least one hardware processor of a transmitting device that is communicatively connected to a receiving device by at least a clear-to-communicate line and a request line: acquire data to be transmitted to the receiving device; when the data is associated with a normal priority, detect whether the clear-to-communicate line indicates that the receiving device is available, if the clear-to-communicate line indicates that the receiving device is available, indicate a request to transmit on the request line, if the clear-to-communicate line indicates that the receiving device is unavailable, wait until the clear-to-communicate line indicates that the receiving device is available, and then indicate a request to transmit on the request line, after indicating a request to transmit on the request line, transmit the data to the receiving device when the clear-to-communicate line indicates that the receiving device is unavailable, and, after transmitting the data to the receiving device, release the indication of the request to transmit on the request line; and, when the data is associated with a high priority, indicate a request to transmit on the request line, regardless of an indication on the clear-to-communicate line, after indicating a request to transmit on the request line, transmit the data to the receiving device when the clear-to-communicate line indicates that the receiving device is available, and, after transmitting the data to the receiving device, release the indication of the request to transmit on the request line. The method may be embodied in executable software modules of a processor-based system, such as a server, and/or in executable instructions stored in a non-transitory computer-readable medium. For example, a system may comprise the clear-to-communicate line, the request line, and the transmitting device that comprises the at least one hardware processor used to perform the method.

In an embodiment, a method is disclosed that comprises using at least one hardware processor of a wireless modem, which relays data between an external microcontroller and an external platform, to: after the wireless modem powers on, transmit an initialize packet to the external microcontroller, wherein the initialize packet indicates a maximum length of packets to be transmitted between the wireless modem and the external microcontroller; when a fault is detected in the external microcontroller, transmit a reset packet to the external microcontroller, wherein the reset packet instructs the external microcontroller to reset itself; and, when a status request packet is received from the external microcontroller, transmit a status response packet to the external microcontroller, wherein the status response packet comprises one or more of a current time, an international mobile subscriber identity (IMSI) of the wireless modem, a network status of the wireless modem, a Global Positioning System (GPS) status of the wireless modem, and an internal temperature of the wireless modem. The status response packet may comprise the current time acquired by the wireless modem from a cellular network to which the wireless modem is connected. The status response packet may comprise the GPS status of the wireless modem, and the GPS status may indicate whether or not GPS satellites are visible to the wireless modem. Each of the initialize packet, the reset packet, and the status response packet may comprise a packet length field and a data load field, and the packet length field in the initialize packet may indicate the maximum length of packets to be transmitted between the wireless modem and the external microcontroller, whereas the packet length field in the status response packet may indicate a length of the data load field. The method may further comprise using at least one hardware processor of the external microcontroller to: transmit the status request packet to the wireless modem; and receive the status response packet from the wireless modem. The external microcontroller may comprise a sensor for detecting an environmental attribute. The method may be embodied in executable software modules of a processor-based system, such as a server, and/or in executable instructions stored in a non-transitory computer-readable medium. For example, a wireless modem may comprise the at least one hardware processor configured to perform the method.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a messaging protocol between an ultra-modem of an ultra-tag and an external microcontroller. After reading this description, it will become apparent to one skilled in the art how to implement the invention in various alternative embodiments and alternative applications. Although various embodiments of the present invention will be described herein, it is understood that these embodiments are presented by way of example and illustration only, and not limitation. As such, this detailed description of various embodiments should not be construed to limit the scope or breadth of the present application as set forth in the appended claims.

1. System Overview
1.1. Infrastructure

Figure 1:
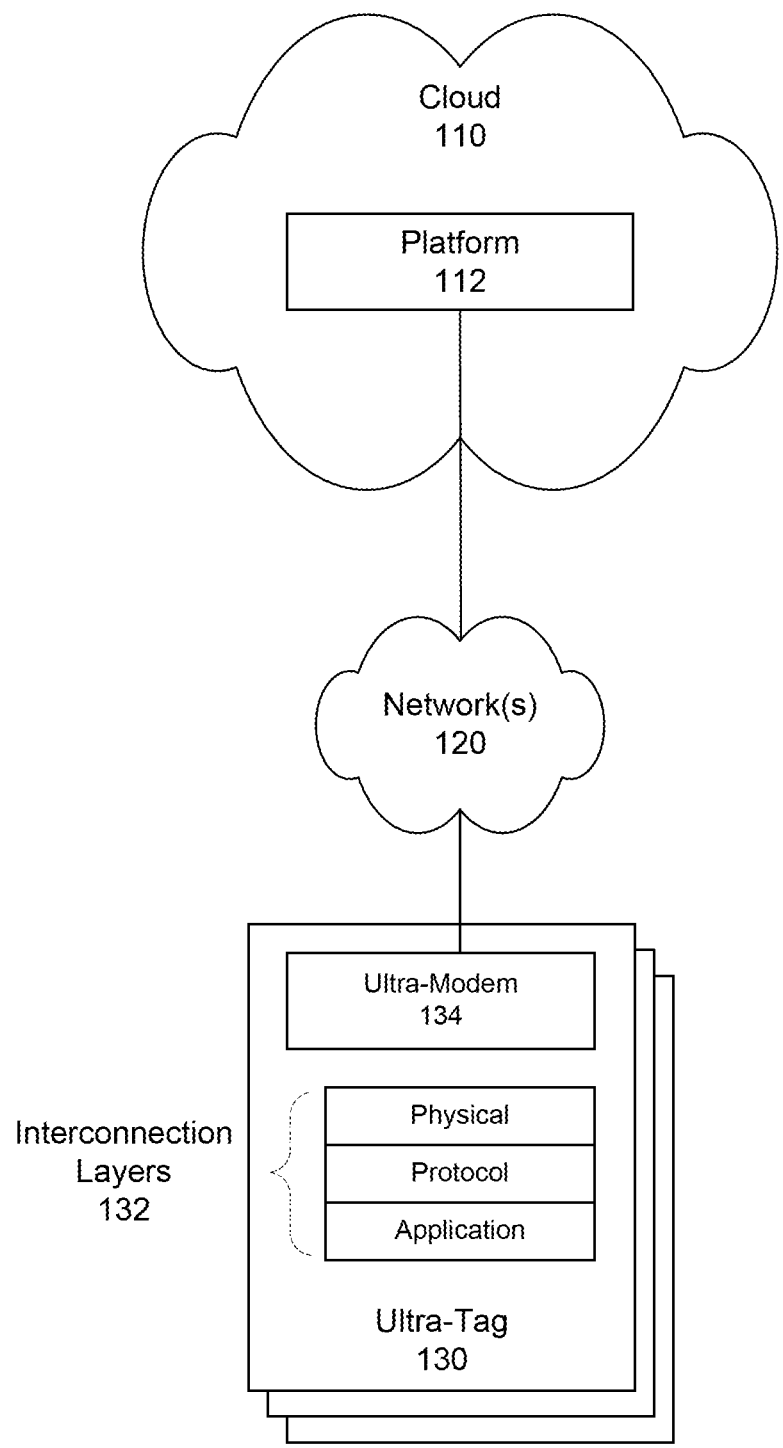
FIG. 1 illustrates an example infrastructure, in which one or more of the processes described herein, may be implemented, according to an embodiment.

FIG. 1 illustrates an example infrastructure in which an ultra-tag may operate, according to an embodiment. The infrastructure may comprise a platform 112 (e.g., one or more servers, applications, databases, services, networks, and/or resources) which hosts and/or executes one or more of the various processes described herein, for example, as software implementing the various server-side processes. As illustrated, platform 112 is comprised in a cloud 110, such that platform 112 is implemented using on-demand access to a pool of collocated and/or dispersed resources (e.g., servers, applications, databases, services, networks, etc.) that are shared with other entities (e.g., other platforms). Cloud 110 may comprise a public cloud, private cloud, and/or other cloud type, including a hybrid cloud comprising a combination of different clouds and/or cloud types. In an alternative infrastructure without cloud 110 or in addition to cloud 110, platform 112 may comprise one or more dedicated resources (e.g., servers, applications, databases, services, networks, etc.) that are not shared with other entities.

As illustrated, platform 112 is communicatively connected to one or more ultra-tags 130 via one or more networks 120. Network(s) 120 may comprise the Internet, and platform 112 may communicate with ultra-tag(s) 130 through the Internet using standard transmission protocols, such as HyperText Transfer Protocol (HTTP), HTTP Secure (HTTPS), File Transfer Protocol (FTP), FTP Secure (FTPS), Secure Shell (SSH) FTP (SFTP), and/or the like, as well as proprietary protocols. Network(s) 120 may also comprise one or more wireless networks, such as a cellular network that employs the Long Term Evolution (LTE) standard for high-speed wireless communications. While platform 112 is illustrated as being connected to all ultra-tags 130 through a single set of network(s) 120, it should be understood that platform 112 may be connected to different ultra-tags 130 via different sets of network(s).

Platform 112 may comprise a web service which receives requests from ultra-tags(s) 130, and provides responses in eXtensible Markup Language (XML), JavaScript Object Notation (JSON), and/or any other suitable or desired format. In such embodiments, platform 112 may provide an application programming interface (API) which defines the manner in which ultra-tag(s) 130 may interact with the web service. A client application executing on one or more ultra-tag(s) 130 may interact with a server application executing on platform 112 to execute one or more or a portion of one or more of the various processes described herein (e.g., implemented in software). The client application may be "thin," in which case processing is primarily carried out server-side by the server application on platform 112. Alternatively, the client application may be "thick," in which case processing is primarily carried out client-side by ultra-tag(s) 130. It should be understood that the client application on ultra-tag(s) 130 may perform an amount of processing, relative to the server application on platform 112, at any point along this spectrum between "thin" and "thick," depending on the design goals of the particular implementation. However, in a preferred embodiment, to minimize power consumption at the ultra-tag, an ultra-thin client application or no client application at all is used, such that most, if not all, processing is performed by a server application on platform 112. In such an embodiment, the server application on platform 112 may provide software-as-a-service (SaaS) for the ultra-tags 130.

As illustrated, ultra-tag(s) 130 may implement a set of interconnection layers 132 to facilitate communications between applications executing on ultra-tag(s) 130 and platform 112 over network(s) 120. Although not shown, platform 112 may implement a similar or identical set of interconnection layers 132. In the illustrated embodiment, interconnection layers 132 comprise a physical layer, a protocol layer, and an application layer. However, this illustrated set of layers is merely representative and non-limiting. In an embodiment, interconnection layers 132 may conform or be similar to the Open Systems Interconnection (OSI) reference model, which includes a physical layer, data-link layer, network layer, transport layer, session layer, presentation layer, and application layer, in that order from lowest to highest. In any case, interconnection layers 132 provide functions for providing a flow of data between a physical layer, in which bits are physically conveyed to and from network(s) 120 (e.g., at the electrical, optical, and/or radio level), at the lowest level and an application layer, which receives data, to be communicated, from applications (e.g., executing on ultra-tag(s) 130) and passes communicated data to those applications, at the highest level.

1.2. Example Processing Device

Figure 2:
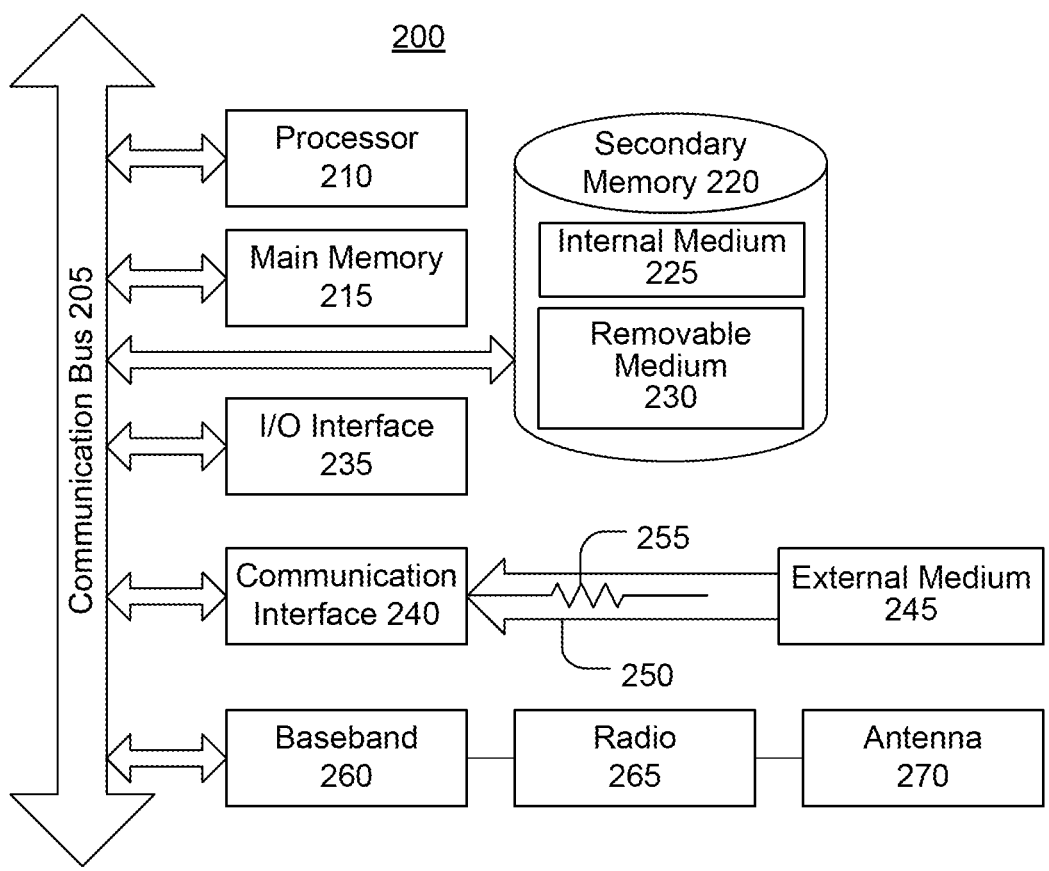
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used in conjunction with one or more of the processes described herein (e.g., to execute software implementing the processes), and may represent components of platform 112, ultra-tag(s) 130, and/or other processing devices described herein. System 200 can be any processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed above. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, and the like. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive signal, which is sent from radio system 265 to baseband system 260.

Baseband system 260 decodes the signal. Baseband system 260 also codes the digital signals for transmission and generates a baseband transmit signal that is routed to radio system 265. The radio mixes the baseband transmit signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

1.3. Example Ultra-tag

Figure 3:
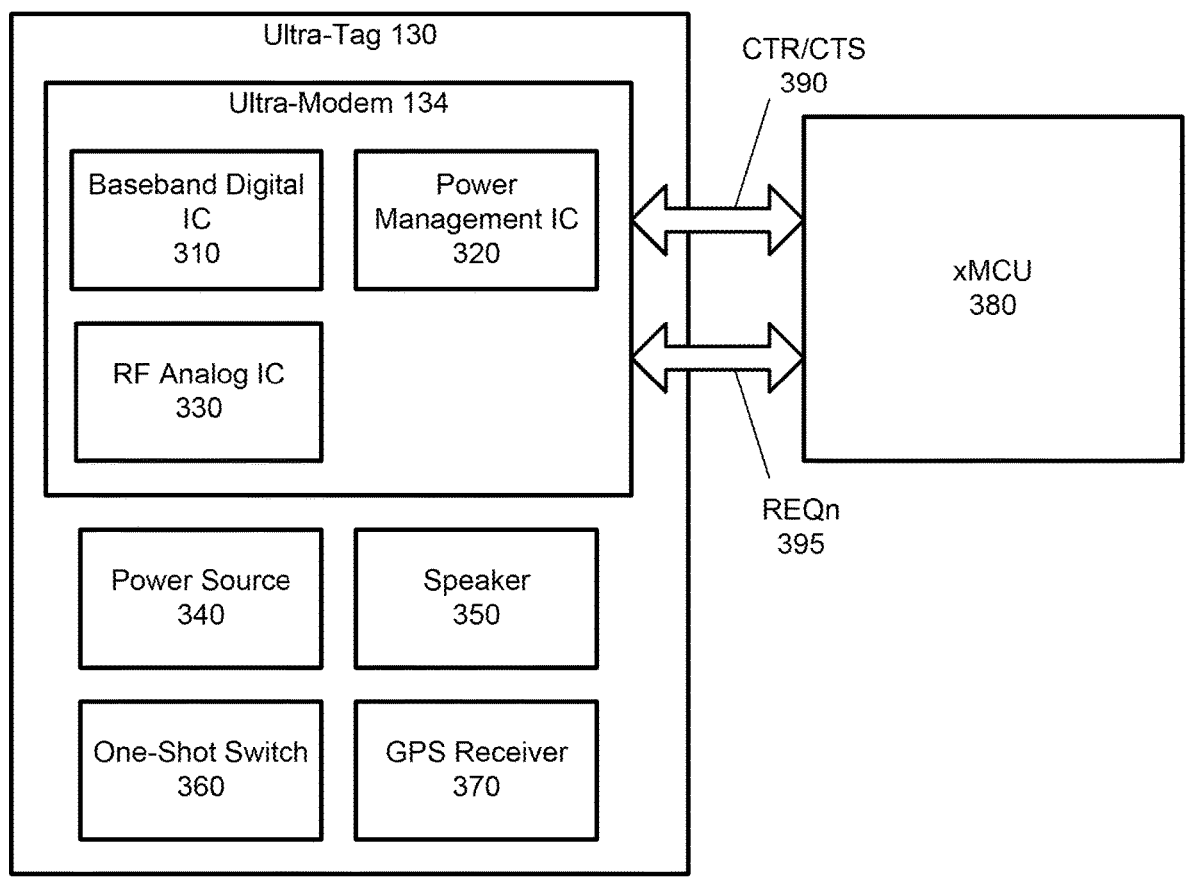
FIG. 3 illustrates an example ultra-tag, according to an embodiment.

FIG. 3 illustrates an example ultra-tag 130, according to an embodiment. Ultra-tag 130 comprises an ultra-modem 134. On the client side, ultra-modem 134 may communicate with one or more external microcontrollers (xMCU) 380, via a wired or wireless connection. In many applications, ultra-modem 134 will be connected to external microcontroller(s) 380 via a wired connection. Ultra-modem 134 may operate to relay information between each external microcontroller 380 and platform 112.

In an embodiment, ultra-tag 130 may also comprise a speaker 350, a one-shot switch 360, and a GPS receiver 370. Speaker 350 may be utilized, for example, to provide audible alerts from ultra-tag 130. One-shot switch 360 may be utilized, for example, to activate or register the ultra-tag 130. GPS receiver 370 may be utilized, for example, to acquire current GPS coordinates for the ultra-tag 130.

Each external microcontroller 380 may comprise a controller that manages one or more sensors or other external devices. Examples of external microcontroller 380 include, without limitation, a smoke detector, a burglar alarm sensing device (e.g., window open or breakage sensor, door open sensor, motion detector, etc.), a moisture sensor (e.g., for lawn or field irrigation, etc.), a temperature sensor (e.g., for medical use, food management, items in transit, etc.), a pressure sensor (e.g., for depth and/or elevation detection, etc.), and/or the like.

For certain applications, an external microcontroller 380 may not be necessary. In such a case, an ultra-modem 134 may not communicate with any external microcontroller 380. For example, an ultra-tag which only reports its location may comprise an on-board Global Positioning System (GPS) receiver 370, and ultra-modem 134 may relay the location of the ultra-tag from GPS receiver 370 to platform 112. Ultra-tags 130 with other onboard sensor(s) or other device(s) are also contemplated. In these cases, ultra-modem 134 may relay data between the onboard device(s) and platform 112.

As illustrated, ultra-tag 130 may comprise or be connected to a power source 340 that provides power to ultra-modem 134, as well as any other components of ultra-tag 130. Power source 340 may comprise a battery (e.g., a D-cell, button cell, rechargeable battery, etc.). Alternatively or additionally, power source 340 may comprise a connection to an "infinite" or significant power source, such as a plug to an electrical grid or a port (e.g., Universal Serial Bus (USB) port) for an electrical connection to a large external battery, such as a car battery or smartphone battery.

In an embodiment, ultra-modem 134 comprises a baseband digital integrated circuit (IC) 310 to manage digital radio functions, a power management IC 320 to manage power requirements of ultra-modem 134, and a radio-frequency (RF) analog IC 330 to manage analog radio functions. Preferably, ultra-modem 134 utilizes cellular technology (e.g., using the LTE standard) to communicate with platform 112, in which case network(s) 120 comprise one or more wireless cellular networks. Advantageously, the use of cellular technology drastically increases the number of applications for which ultra-modem 134 can be used, relative to shorter-range technologies, such as Wi-Fi™ Bluetooth™, and the like. For example, an ultra-tag 130, comprising ultra-modem 134, can be installed in (e.g., embedded within, removably or permanently attached to, etc.) monitored objects, including, without limitation, shoes, vehicles (e.g., car, bicycle, surfboard, train), locks (e.g., bicycle lock), child's backpack or clothes, electronic devices (e.g., smartphone, tablet computer, laptop), pets (e.g., in a collar worn by a pet, in the pet itself, etc.), and virtually any other type of object for which monitoring is desirable. Use of cellular technology, instead of short-range technologies such as Wi-Fi™, allows these objects to be monitored over long distances. For ultra-tags 130 that utilize a battery as their primary power source, the battery life may be extended by the techniques disclosed in U.S. patent application Ser.

No. 15/321,043, filed on Dec. 21, 2016, which claims priority to International Patent App. No. PCT/US2015/037731, filed on Jun. 25, 2015, which claims priority to U.S. Provisional Patent App. No. 62/017,752, and the techniques disclosed in U.S. Provisional Patent App. No. 62/508,254, filed on May 18, 2017, U.S. Provisional Patent App. No. 62/510,620, filed on May 24, 2017, and U.S. Provisional Patent App. No. 62/511,262, filed on May 25, 2017, all of which are hereby incorporated herein by reference.

Ultra-tag 130 and ultra-modem 134 may comprise fewer, more, or different components than those illustrated in FIG. 3. For example, some embodiments of ultra-tag 130 may omit speaker 350, one-shot switch 360, and/or GPS receiver 370.

2. Process Overview

Embodiments of processes for a messaging protocol between ultra-modem 134 of an ultra-tag 130 and external microcontroller 380 will now be described in detail. The described processes may be embodied in one or more software modules that are executed by one or more hardware processors of ultra-tag 130 and/or external microcontroller 380. The described processes may be implemented as instructions represented in source code, object code, and/or machine code. These instructions may be executed directly by the hardware processor(s), or alternatively, may be executed by a virtual machine operating between the object code and the hardware processors.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Assumptions

For embodiments of the messaging protocol described herein, it is assumed that power source 340 comprises an "infinite" power source, significant power source, or a large battery (e.g., vehicle battery). However, it should be understood that this is not required for the functioning of the messaging protocol. Rather, the disclosed hardware lines and data packets, including the defined format and length of each field in the data packets, can be utilized regardless of power source 340.

2.2. Hardware Line Protocol

In an embodiment, ultra-modem 134 and external microcontroller 380 are communicatively connected via at least two hardware lines: (1) Clear-to-Request (CTR)/Clear-to-Send (CTS) line 390; and (2) Request-to-Communicate (REQn) line 395. CTR/CTS line 390 and REQn line 395 are used to facilitate reliable communication between each ultra-modem 134 and external microcontroller 380.

To avoid a race condition and potential "deadly embrace," ultra-modem 134 and external microcontroller 380 may have different back-off times. In an embodiment, ultra-modem 134 is the slave device, and external microcontroller 380 is the master device. If ultra-modem 134 initiates a communication, but does not detect a response from external microcontroller 380 within a first time period (e.g., 100 ms), ultra-modem 134 will back off from the communication. Similarly, if external microcontroller 380 initiates a communication, but does not detect a response from external microcontroller 380 within a second time period (e.g., 200 ms), which may be different than the first time period, external microcontroller 380 will back off from the communication. Following its back-off, each device will reattempt communication without the risk of a race condition.

In an embodiment, the line protocol comprises two forms of communication between ultra-modem 134 and external microcontroller 380: (1) normal-priority; and (2) high-priority.

2.2.1. Normal-Priority Communication Protocol

In the normal-priority communication protocol, each of ultra-modem 134 and external microcontroller 380 is free to communicate at any time at which the other device (i.e., the other one of the ultra-modem 134 and external microcontroller 380) is available. If one of these devices wants to communicate with the other device, but the other device is unavailable, then the device will delay the communication until the other device becomes available. In an embodiment, availability may mean that a device is able to communicate without disruption of an activity occurring at that device, whereas unavailability may mean that a communication to a device would disrupt an activity occurring at that device.

In an embodiment, CTR/CTS line 390 is pulled down (e.g., CTR/CTS=low) by either device (i.e., either ultra-modem 134 or external microcontroller 380) when that device is unavailable (e.g., busy). This will cause the other device to back off from or delay communicating. On the other hand, CTR/CTS 390 is released (e.g., CTR/CTS=high) by either device when that device is available. This enables the other device to communicate as needed.

In an embodiment, if either ultra-modem 134 or external microcontroller 380 wants to perform a normal-priority communication with the other device, it will wait until CTR/CTS line 390 is high (e.g., CTR/CTS=high), and then pull down REQn line 395 (e.g., REQn=low). When the other device detects that REQn line 395 is low, it will pull CTR/CTS line 390 down (e.g., CTR/CTS=low) to confirm its commitment to communicate. A data packet can then be exchanged between ultra-modem 134 and external microcontroller 380. Upon completion of the data packet exchange, the requesting device releases REQn line 395 (e.g., REQn=high), and the receiving device releases CTR/CTS line 390 (e.g., CTR/CTS=high).

It should be understood that, in an alternative embodiment, the meaning of the high and low signals of CTR/CTS line 390 and/or REQn line 395 could be reversed (e.g., CTR/CTS=high when pulled down and CTR/CTS=low when released, and/or REQn=high when pulled down and REQn=low when released).

2.2.2. High-Priority Communication Protocol

In the high-priority communication protocol, one of ultra-modem 134 and external microcontroller 380 needs to communicate urgently (e.g., transmit urgent data) with the other device. Therefore, the device will communicate with the other device, regardless of whether or not the other device is available (e.g., even if an activity at the other device will be interrupted by the communication). An example of an urgent communication while the other device is unavailable may be the need to transmit an alarm from an external microcontroller 380 (e.g., acting as a fire sensor) to ultra-modem 134, while ultra-modem 134 is in the middle of communicating with platform 112. In this case, the ultra-modem's communication with platform 112 will be interrupted, and ultra-modem 134 will be forced to manage the transmitted alarm event as its highest priority.

In the high-priority communication protocol, the status of CTR/CTS line 390 is irrelevant. The one of ultra-modem 134 and external microcontroller 380 that needs to communicate urgently will behave as if CTR/CTS line 390 is high, regardless of the actual state of CTR/CTS line 390 (i.e., will communicate even if CTR/CTS line 390 has been pulled down, e.g., when CTR/CTS=low).

In an embodiment, if either ultra-modem 134 or external microcontroller 380 wants to perform a high-priority communication with the other device, it will pull down REQn line 395 (e.g., REQn=low). When the other device detects that REQn line 395 is low, it will release CTR/CTS line 390 (e.g., CTR/CTS=high) to confirm its availability to communicate. Any tasks or other activities that were causing the other device to be unavailable may be interrupted or overridden. A data packet can then be exchanged between ultra-modem 134 and external microcontroller 380. Upon completion of the data packet exchange, the requesting device releases REQn line 395 (e.g., REQn=high), and the receiving device releases CTR/CTS line 390 (e.g., CTR/CTS=high).

2.2.3. Example Process Flows

Figure 4A:
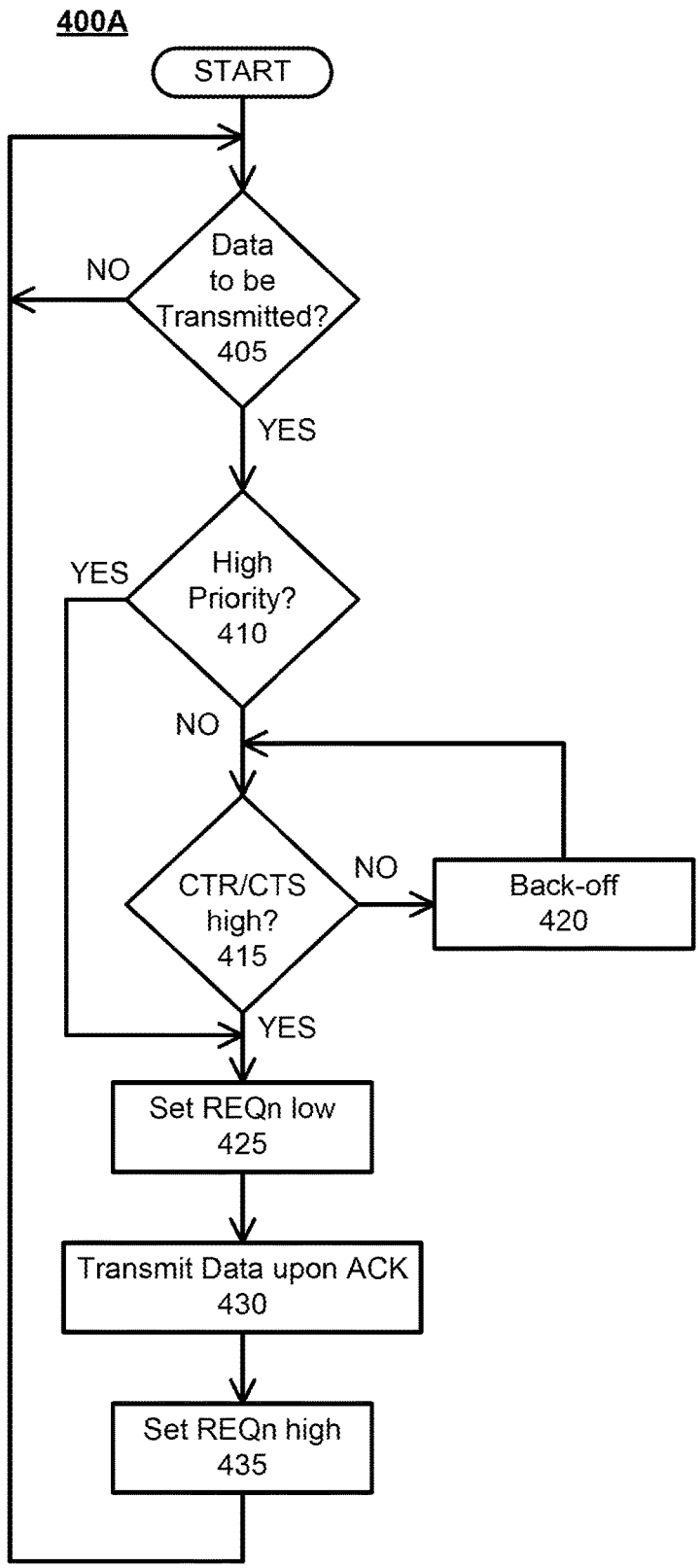
FIGS. 4A-4B illustrate transmission and reception processes in a messaging protocol, according to an embodiment.

FIG. 4A is a flowchart of a transmission process 400A, according to an embodiment of the messaging protocol. Transmission process 400A may be implemented by one or more processors of either ultra-modem 134 and/or external microcontroller 380 as a transmitting device. While transmission process 400A is illustrated with a certain arrangement of steps, transmission process 400A may be implemented with fewer, more, or different steps and a different arrangement or ordering of steps.

If the transmitting device needs to transmit data (i.e., "YES" in step 405), process 400A proceeds to step 410. Otherwise (i.e., "NO" in step 405), process 400A continues to wait until data needs to be transmitted.

In step 410, the transmitting device determines whether the data should be transmitted according to the normal-priority communication protocol or high-priority communication protocol. In an embodiment, urgent communications (e.g., alarms) are transmitted with high priority, whereas all other communications are transmitted with normal priority. If the data is to be transmitted with normal priority (i.e., "NO" in step 410), process 400A proceeds to step 415. Otherwise, if the data is to be transmitted with high priority (i.e., "YES" in step 410), process 400A skips to step 425.

In step 415, the transmitting device determines whether or not CTR/CTS line 390 is high. If CTR/CTS line 390 is not high (i.e., "NO" in step 415), the transmitting device performs a back-off (i.e., a time period, e.g., 100 or 200 ms) in step 420, before returning to step 415 to check CTR/CTS line 390 again. Once CTR/CTS line 390 is high (i.e., "YES" in step 415), process 400A proceeds to step 425.

In step 425, the transmitting device sets REQn line 395 low to signal to the receiving device that it has data to be transmitted. Once the receiving device acknowledges the request (e.g., by setting CTR/CTS line 390 low or toggling CTR/CTS line 390), the transmitting device transmits the data in step 430. Once the data has been transmitted, the transmitting device releases REQn line 395 to high, and returns to waiting for data in step 405.

Figure 4B:
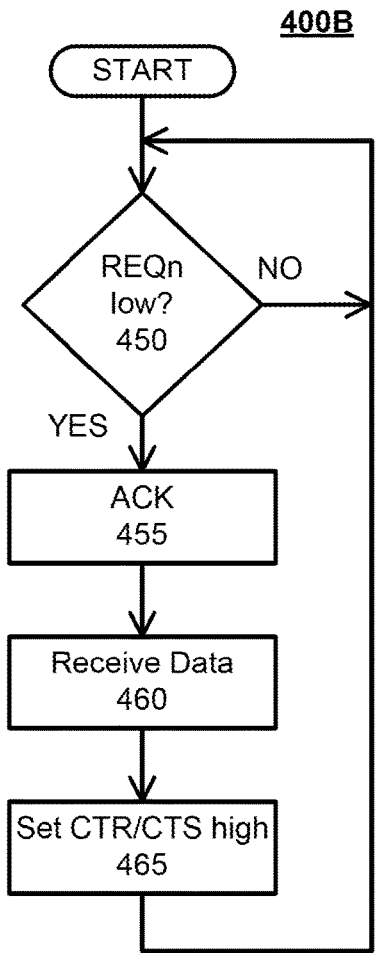

FIG. 4B is a flowchart of a reception process 400B, according to an embodiment of the messaging protocol. Reception process 400B may be implemented by one or more processors of either ultra-modem 134 and/or external microcontroller 380 as a receiving device. While reception process 400B is illustrated with a certain arrangement of steps, reception process 400B may be implemented with fewer, more, or different steps and a different arrangement or ordering of steps.

In step 450, the receiving device determines whether or not REQn line 395 is low. If REQn line 395 is high (i.e., "NO" in step 450), the receiving device continues to wait for a new request. When the receiving device detects that REQn line 395 is low (i.e., "YES" in step 450), the receiving device acknowledges the request in step 455. The receiving device may acknowledge the request, for example, by toggling CTR/CTS line 390 from high to low (or vice versa).

In step 460, the receiving device receives data from the transmitting device. After receiving the data, the receiving device releases CTR/CTS line 390 to high in step 465, and returns to waiting for another request in step 450.

2.2.4. Example Timing

Figure 5A:
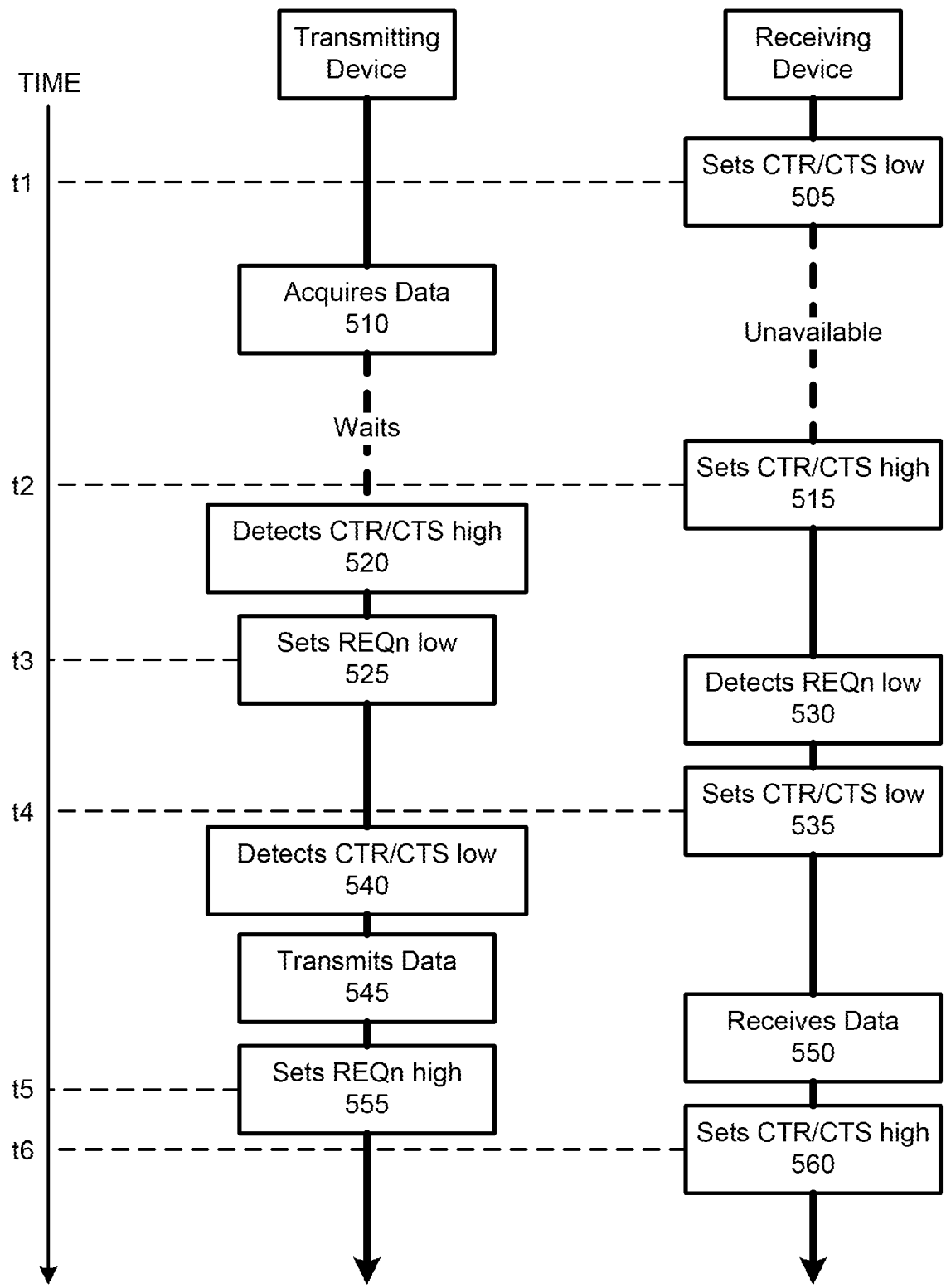
FIGS. 5A-5B and 6A-6B illustrate timings and states for communications in a messaging protocol, according to an embodiment.

FIG. 5A is an example timing diagram for the normal-priority communication protocol, according to an embodiment. In the diagram, time proceeds vertically from the top to the bottom of the figure, and is not necessarily to scale.

Initially, at time t1, in step 505, a receiving device may pull CTR/CTS line 390 to low, thereby indicating that the receiving device is unavailable (e.g., busy with an activity). If a transmitting device acquires normal-priority data to transmit to the receiving device in step 510, it detects that CTR/CTS line 390 is low (i.e., that the receiving device is unavailable) and waits until CTS/CTS line 390 is released to high. At time t2, in step 515, the receiving device completes the activity, and releases CTR/CTS line 390 to high, thereby indicating that the receiving device is available.

The transmitting device detects that CTR/CTS line 390 has been released to high in step 520. Consequently, at time t3, in step 525, the transmitting device pulls REQn line 395 to low, thereby indicating that the transmitting device has data to send.

The receiving device detects that REQn line 395 has been pulled to low in step 530. Consequently, at time t4, in step 535, the receiving devices pulls CTR/CTS line 390 to low, thereby acknowledging its commitment to the transmitting device's communication request.

The transmitting device detects that CTR/CTS line 390 has been pulled to low in step 540, which acts as an ACK from the receiving device that it is committed to the communication. Consequently, in step 545, the transmitting device transmits the data, acquired in step 510, to the receiving device, which receives the data in step 550.

Following transmission of the data, the transmitting device releases REQn line 395 to high at time t5 in step 555. Similarly, following reception of the data, the receiving device releases CTR/CTS line 390 to high at time t6 in step 560.

Figure 5B:
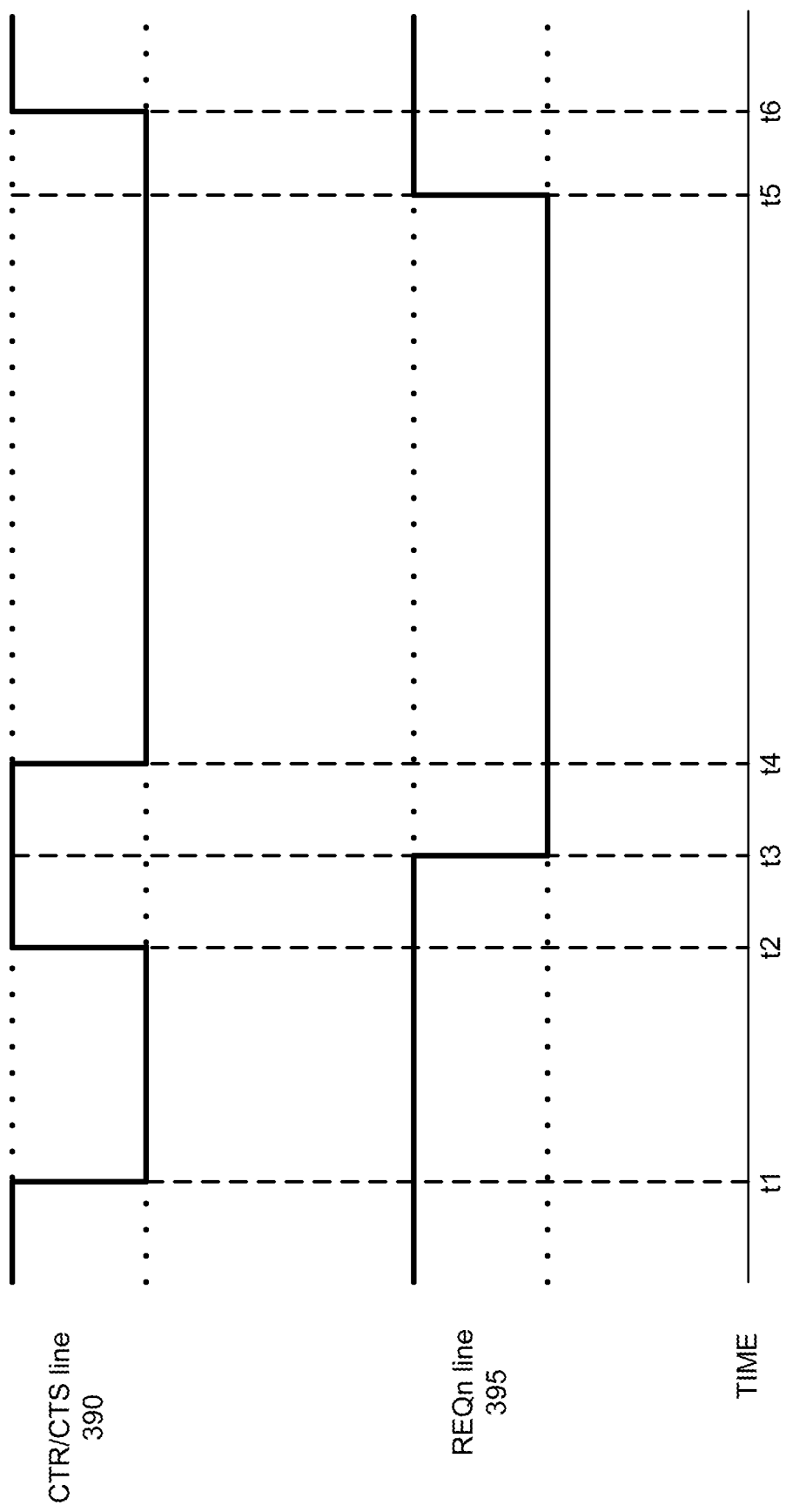

FIG. 5B illustrates the states of CTR/CTS line 390 and REQn line 395 during the normal-priority communication protocol illustrated in FIG. 5A, according to an embodiment. Specifically, CTR/CTS line 390 starts high, is pulled low at time t1 (i.e., step 505), released to high at time t2 (i.e., step 515), pulled low at time t4 (i.e., step 535), and released to high at time t6 (i.e., step 560). REQn line 395 starts high, is pulled low at time t3 (i.e., step 525), and released to high at time t5 (i.e., step 555). It should be understood that, in an alternative embodiment, the representations of either CTR/CTS line 390 and/or REQn line 395 as low and high may be reversed.

Figure 6A:
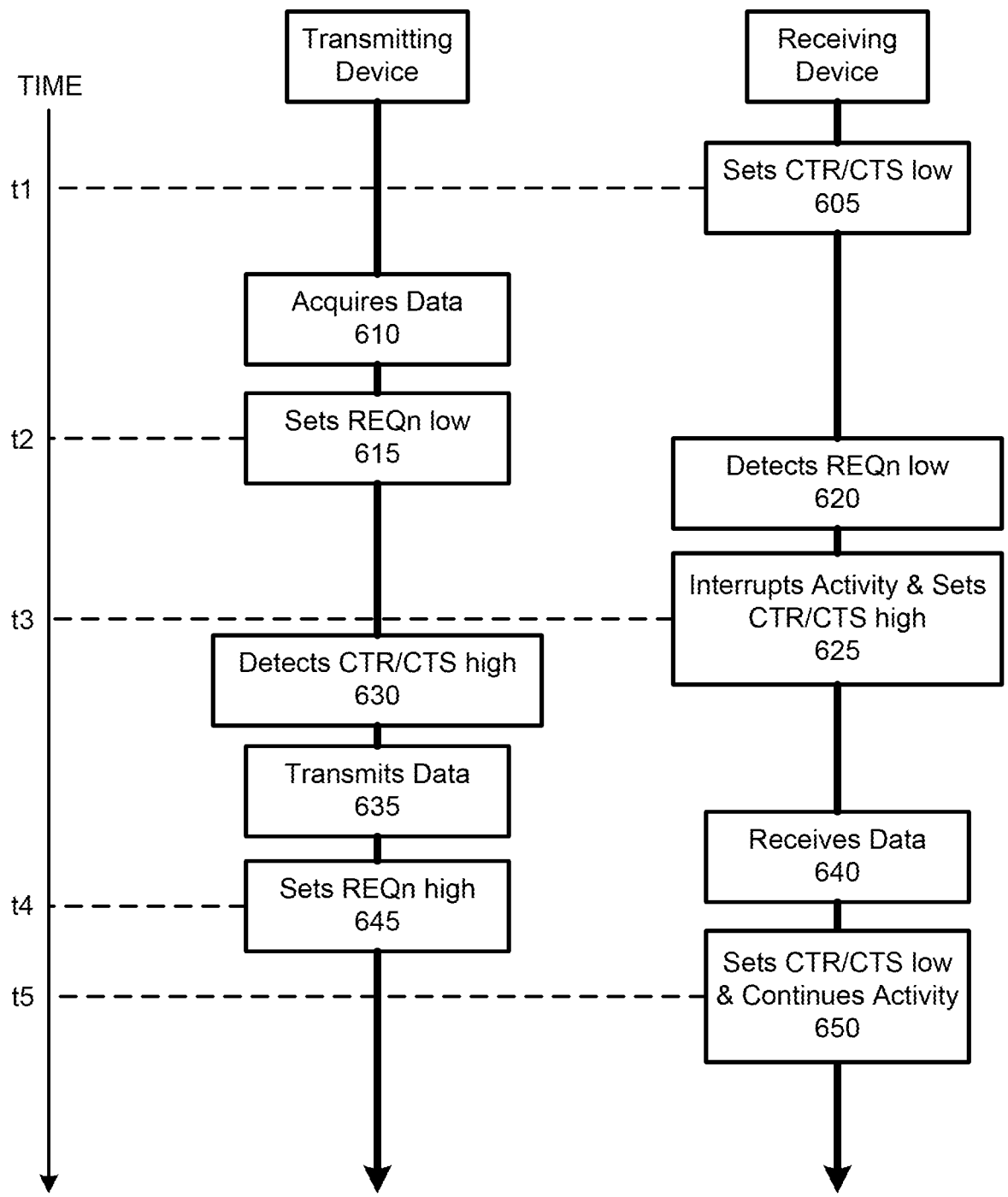

FIG. 6A is an example timing diagram for the high-priority communication protocol, according to an embodiment. In the diagram, time proceeds vertically from the top to the bottom of the figure, and is not necessarily to scale.

Initially, at time t1, in step 605, a receiving device may pull CTR/CTS line 390 to low, thereby indicating that the receiving device is unavailable (e.g., busy with an activity). If a transmitting device acquires high-priority data to transmit to the receiving device in step 610, it pulls REQn line 395 to low at time t2 in step 615. Unlike the normal-priority case in FIG. 5A, in this case, since the data is a high priority, the transmitting device does not wait until CTR/CTS line 390 is released to high before pulling REQn line 395 to low.

The receiving device detects that REQn line 395 has been pulled to low in step 620. Consequently, at time t3, in step 625, the receiving device interrupts its activity and releases CTR/CTS line to high, thereby acknowledging its commitment to the transmitting device's communication request.

The transmitting device detects that CTR/CTS line 390 has been released to high in step 630, which acts as an ACK from the receiving device that it is committed to the communication. Consequently, in step 635, the transmitting device transmits the data, acquired in step 610, to the receiving device, which receives the data in step 640.

Following transmission of the data, the transmitting device releases REQn line 395 to high at time t4 in step 645. Following reception of the data, the receiving device may pull CTR/CTS line 390 back to low at time t5 in step 650, thereby indicating that it is unavailable as it returns to the activity that was interrupted in step 625.

Figure 6B:
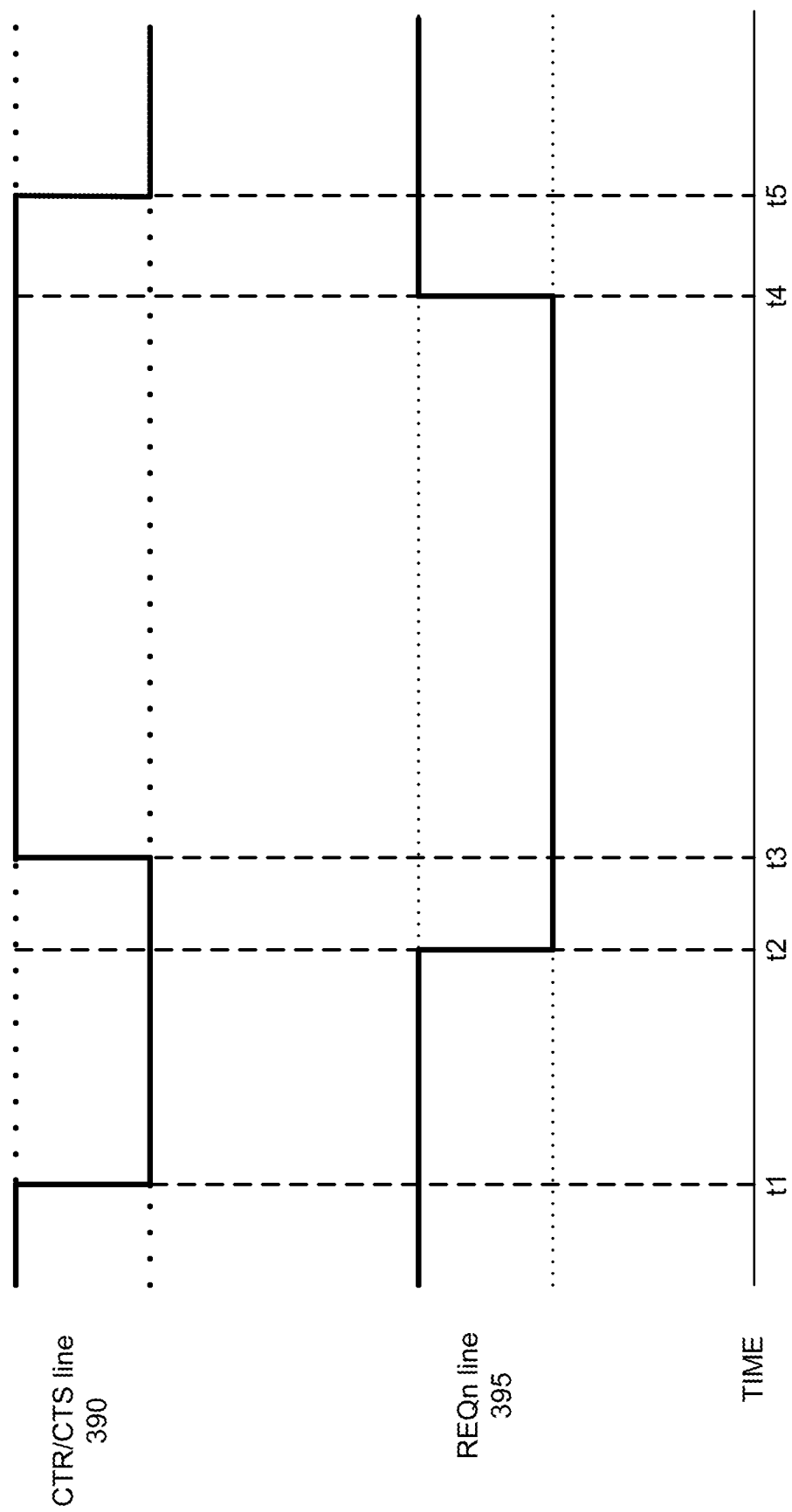

FIG. 6B illustrates the states of CTR/CTS line 390 and REQn line 395 during the high-priority communication protocol illustrated in FIG. 6A, according to an embodiment. Specifically, CTR/CTS line 390 starts high, is pulled low at time t1 (i.e., step 605), released to high at time t3 (i.e., step 625), and pulled low at time t5 (i.e., step 650). REQn line 395 starts high, is pulled low at time t2 (i.e., step 615), and released to high at time t4 (i.e., step 645). It should be understood that, in an alternative embodiment, the representations of either CTR/CTS line 390 and/or REQn line 395 as low and high may be reversed.

2.2.5. Usage Considerations

Since external microcontroller 380 can interrupt ultra-modem 134 at essentially any time, the following should be considered in the development of an external microcontroller 380 and/or the external application on cloud-based platform 112:

(1) When a first packet of data has been transmitted by external microcontroller 380 to ultra-modem 134, if external microcontroller 380 interrupts ultra-modem 134 by transmitting a second packet while ultra-modem 134 is relaying the first packet to platform 112, the first packet will be lost (or delayed). This will result in the second packet being relayed to platform 112 instead of the first packet (or before the first packet).

(2) In an embodiment, ultra-modem 134 does not notify external microcontroller 380 when a packet has been successfully relayed to platform 112. While ultra-modem 134 does return an ACK to external microcontroller 380 in response to receiving a packet from external microcontroller 380, this ACK simply notifies external microcontroller 380 that the packet was received at ultra-modem 134 with a valid CRC. Thus, it is contemplated that, should the external application on cloud-based platform 112 need to notify external microcontroller 380 that the packet was successfully received, the external application will send such a notification message from platform 112 through ultra-modem 134 to external microcontroller 380. If external microcontroller 380 fails to receive this notification message within a timeout period (e.g., defined by the OEM), external microcontroller 380 should retransmit the packet.

(3) If ultra-modem 134 receives a packet from external microcontroller 380 while it is out-of-range of a cellular network (i.e., cannot connect to network(s) 120), ultra-modem 134 will continue trying to relay the packet to platform 112 until either it is successful or another packet is received from external microcontroller 380.

2.3. Message Packet Definition

Example definitions for packets transmitted between ultra-modem 134 and external microcontroller 380 will now be described according to an embodiment. The description includes the defined format and length of each field in a packet. However, these definitions are provided by way of example only, and not limitation. Thus, it should be understood that other definitions of the packets are possible.

In an embodiment, packets sent between ultra-modem 134 and external microcontroller 380 are based upon the maximum message size N that can be sent between ultra-modem 134 and cloud-based platform 112. Thus, the maximum size of the data load will depend upon the utilized carrier methodology.

In an embodiment, the packet between ultra-modem 134 and external microcontroller 380 is defined as follows in Table 1:

TABLE 1

Packet Definition

| Field | Byte Position | Description |
|---|---|---|
| Command | 0 | Commands per the ultra-modem specification. |
| CRC | 1-2 | Cyclic Redundancy Check (CRC) (e.g., CRC16) of bytes at positions 3-N. For messages from the ultra-modem to the external microcontroller, this is calculated by the ultra-modem. For messages from the external microcontroller to the ultra-modem, this is calculated by the external microcontroller and will be interrogated by the ultra-modem, upon receipt and prior to an ACK (or NACK prompting retransmission by the external microcontroller) and prior to relaying of the packet from the ultra-modem to the platform. |

TABLE 1-continued

Packet Definition

| Field | Byte Position | Description |
|---|---|---|
| Packet Length | 3-4 | For any Command other than a command to initialize, this field is used to indicate the number of bytes in Data Load. In these non-initialization cases, 15 bits are used to indicate the packet length of Data Load. In an embodiment, a most significant bit of 1 indicates that the following 2 bytes (i.e., byte positions 5-6) include additional packet length data, whereas a most significant bit of 0 indicates that the following 2 bytes include data (i.e., byte positions 5-6 are the beginning bytes of Data Load). The packet length can be prepared by the platform or by the external microcontroller. A packet length of zero indicates that no data follows in Data Load. In the case of an initialize command in the Command field, all 16 bits may be used to indicate the number of bytes available for Data Load in subsequent packets. |
| Data Load | 5-N | This is the data sent from either the platform (i.e., relayed through the ultra-modem) or from the external microcontroller (i.e., to be relayed to the platform). It is not interrogated by the ultra-modem. |

The commands that may be sent by ultra-modem 134 to external microcontroller 380 (i.e., the value of the Command field in a packet sent from ultra-modem 134 to external microcontroller 380) are listed in Table 2, according to an embodiment:

TABLE 2

Commands from Ultra-Modem to External Microcontroller

| Hexadecimal Bytes | Command | Description |
|---|---|---|
| 00 | Initialize | Initialize the external microcontroller by notifying the external microcontroller that the ultra-modem is active and includes (e.g., in the Packet Length field of the packet) the maximum packet size that can be used by the external microcontroller to send and receive data to the platform. |
| 01 | Reset | Resets the external microcontroller. This may be a forced factory reset of the external microcontroller, in which case the responsive action performed by the external microcontroller is specific to the original equipment manufacturer (OEM). In an embodiment, following the reset command, the ultra-modem will send an initialize command. |
| 02 | Ultra-Modem Status | This command indicates that status data is being sent from the ultra-modem to the external microcontroller in response to an Ultra-Modem Status request from the external microcontroller. In an embodiment, the status data (i.e., in the Data Load of the packet) comprises the current time, the international mobile subscriber identity (IMSI) of the ultra-modem, the network status (e.g., connected or not connected) of the ultra-modem, the GPS status (e.g., satellites visible or not visible) of the ultra-modem, and the internal temperature of the ultra-modem. |
| 0F | ACK | This command notifies the external microcontroller that the ultra-modem received data from the external microcontroller with a valid CRC. |
| FF | NACK | This command notifies the external microcontroller that the ultra-modem received data from the external microcontroller with an invalid CRC. |

The commands that may be sent by external microcontroller 380 to ultra-modem 134 (i.e., the value of the Command field in a packet sent from external microcontroller 380 to ultra-modem 134) are listed in Table 3, according to an embodiment:

TABLE 3

Commands from External Microcontroller to Ultra-Modem

| Hexadecimal Bytes | Command | Description |
|---|---|---|
| 02 | Ultra-Modem Status | This command requests status data from the ultra-modem. In an embodiment, the status data comprises the current time, the IMSI of the ultra-modem, the network status (e.g., connected or not connected) of the ultra-modem, the GPS status (e.g., satellites visible or not visible) of the ultra-modem, and the internal temperature of the ultra-modem. |
| 0F | ACK | This command notifies the ultra-modem that the external microcontroller received data from the ultra-modem with a valid CRC. |
| FF | NACK | This command notifies the ultra-modem that the external microcontroller received data from the ultra-modem with an invalid CRC. |

The Ultra-Modem Status command allows external microcontroller 380 to query ultra-modem 134 about key data elements, including the time and other aspects of ultra-modem 134 that external microcontroller 380 may find of value during its normal operation. In an embodiment, this command, sent from external microcontroller 380 to ultra-modem 134, causes ultra-modem 134 to connect to network(s) 120 in order to acquire the current time (e.g., from platform 112).

In an embodiment, the Ultra-Modem Status returned by ultra-modem 134 to external microcontroller 380, in response to the Ultra-Modem Status command sent by external microcontroller 380 to ultra-modem 134, comprises the following data in the Data Load of the packet:

TABLE 4

Data Load of Ultra-Modem Status
Packet Returned by Ultra-Modem

| Byte Position | Data |
|---|---|
| 5-8 | The true Coordinated Universal Time (UTC) per the applicable cellular system's specification. |
| 9-16 | IMSI of the ultra-modem. |
| 17 | Network status, e.g., 00 = not available, 01 = available. |
| 18 | Satellite status, e.g., 00 = no visible satellites, 01 = visible satellites. |
| 19 | Internal temperature of ultra-modem. |

It should be understood that the Data Load of the Ultra-Modem Status packet may comprise fewer, more (e.g., the Data Load may be expanded to include additional data), or different fields than those described in Table 4. Table 4 simply represents one example of what the status data for ultra-modem 134 may comprise.

2.4. Use Models

The disclosed messaging protocol is designed to utilize ultra-modem 134 purely as a data carrier or relay. Example usage of the messaging protocol, the messaging protocol's impact on the design of external microcontrollers 380, and the interaction of cloud-based platform 112 with external microcontrollers 380 and ultra-modems 134 will now be described.

2.4.1. Initialization

Once ultra-modem 134 powers on, ultra-modem 134 will transmit an initialize message (i.e., a packet with Command=00) to external microcontroller 380, thereby notifying external microcontroller 380 that ultra-modem 134 is powered on. The initialize message includes the maximum supported length of a data load, for example, in the Packet Length field of the initialize message. In the example described herein, the Packet Length field is a two-byte field, which allows for a data load length of 64k bytes. However, typical applications will generally utilize data loads that are much shorter than 64k bytes.

2.4.2. Reset

If ultra-modem 134 believes that external microcontroller 380 has a fault (e.g., based on one or more fault criteria), ultra-modem 134 will transmit a reset message (i.e., a packet with Command=01) to external microcontroller 380, to thereby force external microcontroller 380 to reset itself. In an embodiment, external microcontroller 380 resets itself to a factory reset state. After transmitting the reset message, ultra-modem 134 will transmit an initialize message, for example, to reestablish the packet length for data loads.

2.4.3. Data Load from Platform

For an external application to communicate with external microcontroller 380, the external application uses cloud-based platform 112 to send a packet to the external microcontroller 380 through a given ultra-modem 134. Possible uses of the data load of the packet transmitted from the external application include, without limitation:

(1) Requesting the external microcontroller's status from external microcontroller 380. Notably, in the described example, the relaying ultra-modem 134 does not have the ability to request the external microcontroller's status. Thus, a status request to external microcontroller 380 must be directed by the external application of platform 112.

(2) Sending command(s) to external microcontroller 380 and/or one or more devices communicatively connected (e.g., attached) to external microcontroller 380. Possible commands include, without limitation, to turn on a sensor, to turn off a sensor, to set a level of a sensor to X, and/or the like.

(3) Sending firmware updates to external microcontroller 380 and/or one or more devices communicatively connected to external microcontroller 380.

2.4.4. Data Load from External Microcontroller

If a sensor in or attached to external microcontroller 380 needs to communicate data to the external application supported by cloud-based platform 112, external microcontroller 380 assembles a packet with a data load, comprising the data that needs to be communicated, and transmits the packet through ultra-modem 134 to cloud-based platform 112, and thus, to the external application.

As discussed elsewhere herein, if the packet is of high priority (e.g., an alarm), external microcontroller 380 may transmit the packet immediately, regardless of whether or not ultra-modem 134 is available. If the packet is of normal priority, external microcontroller 380 will transmit the packet immediately if ultra-modem 134 is available or wait to transmit the packet if ultra-modem 134 is not available. Possible uses of the data load of the packet transmitted from external microcontroller 380 include, without limitation:

(1) Sending unsolicited or solicited status information for external microcontroller 380 and/or a device (e.g., sensor) attached to external microcontroller 380 to the external application.

(2) Sending unsolicited or solicited data (e.g., sensor data) to the external application.

2.4.5. Data Load Usage Concepts

To send large amounts of data (e.g., more than a single packet with a single data load), the external application on platform 112 and external microcontroller 380 must divide up the data into a plurality of data loads to be transmitted in a plurality of packets. In this case, the packets may need to be marked in some way, for example, to indicate that they are part of a set of packets, and optionally, their order in a sequence of packets. For example, if the data is divided into four data loads, the first data load in a first packet may identify itself as one of four, the second data load in a second packet may identify itself as two of four, and so on. Since ultra-modem 134 does not interrogate the data load, the receiver of the packets (i.e., either the external application at platform 112 or external microcontroller 380) is responsible for reassembling the data loads in the packets into the full block of data.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor of a wireless modem, which relays data between an external microcontroller and an external platform, to:
    after the wireless modem powers on, transmit an initialize packet to the external microcontroller, wherein the initialize packet indicates a maximum length of packets to be transmitted between the wireless modem and the external microcontroller;
    when a fault is detected in the external microcontroller, transmit a reset packet to the external microcontroller, wherein the reset packet instructs the external microcontroller to reset itself; and,
    when a status request packet is received from the external microcontroller, transmit a status response packet to the external microcontroller, wherein the status response packet comprises one or more of a current time, an international mobile subscriber identity (IMSI) of the wireless modem, a network status of the wireless modem, a Global Positioning System (GPS) status of the wireless modem, and an internal temperature of the wireless modem.

2. The method of claim 1, wherein the status response packet comprises the current time acquired by the wireless modem from a cellular network to which the wireless modem is connected.

3. The method of claim 1, wherein the status response packet comprises the GPS status of the wireless modem, and wherein the GPS status indicates whether or not GPS satellites are visible to the wireless modem.

4. The method of claim 1, wherein each of the initialize packet, the reset packet, and the status response packet comprise a packet length field and a data load field, and wherein the packet length field in the initialize packet indicates the maximum length of packets to be transmitted between the wireless modem and the external microcontroller, but the packet length field in the status response packet indicates a length of the data load field.

5. The method of claim 1, further comprising using at least one hardware processor of the external microcontroller to:
    transmit the status request packet to the wireless modem; and
    receive the status response packet from the wireless modem.

6. The method of claim 1, wherein the external microcontroller comprises a sensor for detecting an environmental attribute.

7. A wireless modem which relays data between an external microcontroller and an external platform, wherein the wireless modem comprises at least one hardware processor configured to:
    after the wireless modem powers on, transmit an initialize packet to the external microcontroller, wherein the initialize packet indicates a maximum length of packets to be transmitted between the wireless modem and the external microcontroller;
    when a fault is detected in the external microcontroller, transmit a reset packet to the external microcontroller, wherein the reset packet instructs the external microcontroller to reset itself; and,
    when a status request packet is received from the external microcontroller, transmit a status response packet to the external microcontroller, wherein the status response packet comprises one or more of a current time, an international mobile subscriber identity (IMSI) of the wireless modem, a network status of the wireless modem, a Global Positioning System (GPS) status of the wireless modem, and an internal temperature of the wireless modem.

8. A non-transitory computer-readable medium having instructions stored therein, wherein the instructions, when executed by a processor of a wireless modem which relays data between an external microcontroller and an external platform, cause the processor to:
    after the wireless modem powers on, transmit an initialize packet to the external microcontroller, wherein the initialize packet indicates a maximum length of packets to be transmitted between the wireless modem and the external microcontroller;
    when a fault is detected in the external microcontroller, transmit a reset packet to the external microcontroller, wherein the reset packet instructs the external microcontroller to reset itself; and,
    when a status request packet is received from the external microcontroller, transmit a status response packet to the external microcontroller, wherein the status response packet comprises one or more of a current time, an international mobile subscriber identity (IMSI) of the wireless modem, a network status of the wireless modem, a Global Positioning System (GPS) status of the wireless modem, and an internal temperature of the wireless modem.

* * * * *